3,054,468
DRIVING TRANSMISSIONS FOR THE REAR WHEELS AND FRONT WHEELS OF STEERABLE MOTOR VEHICLES

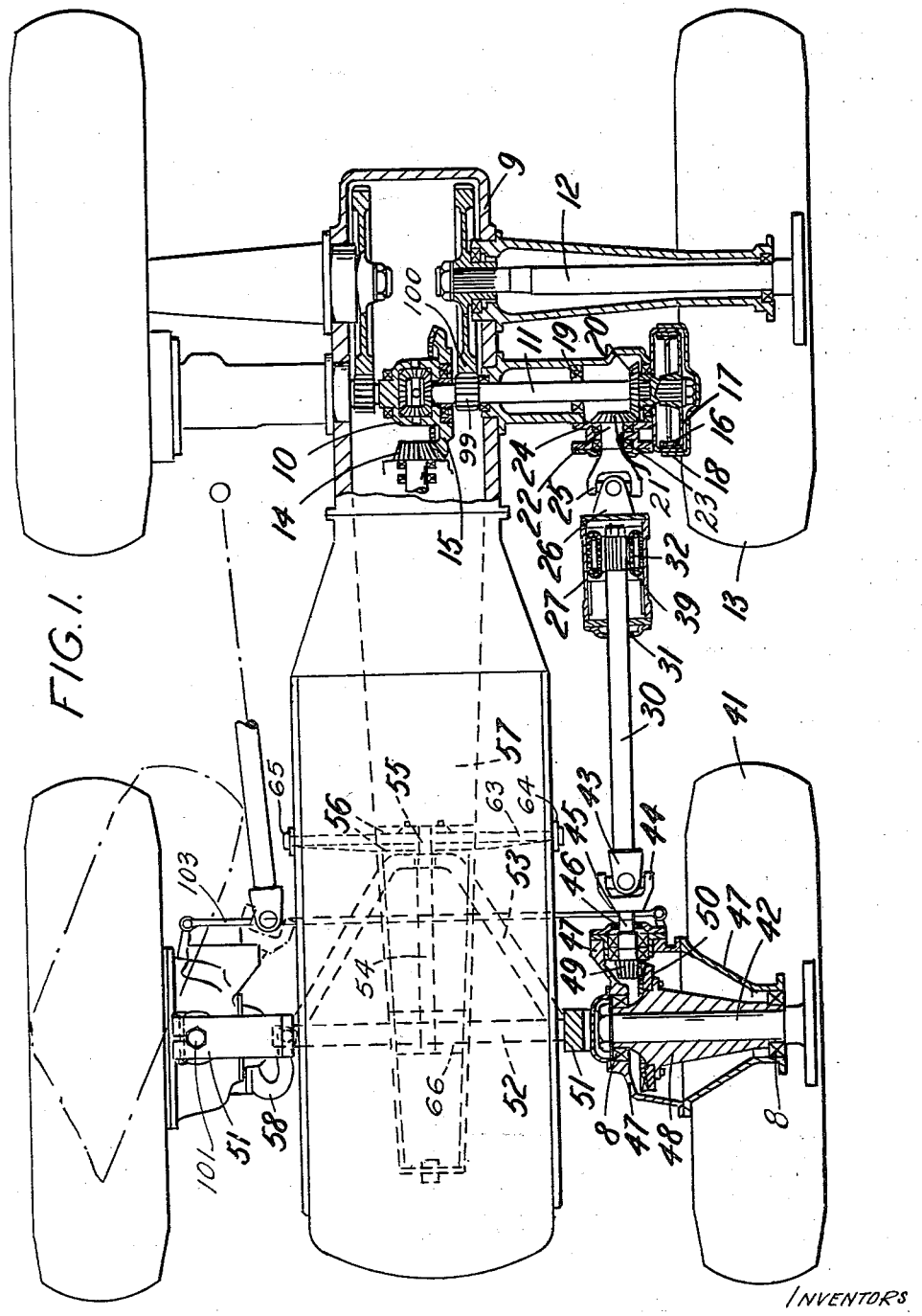

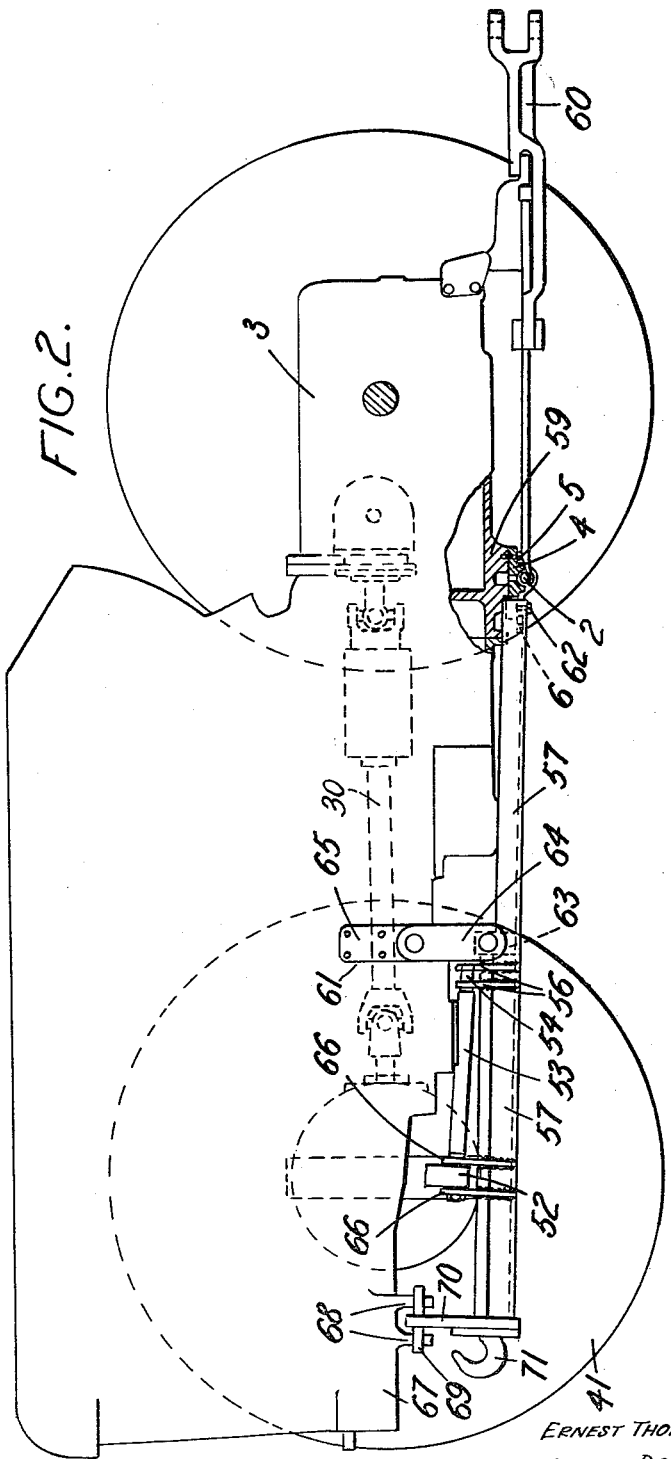

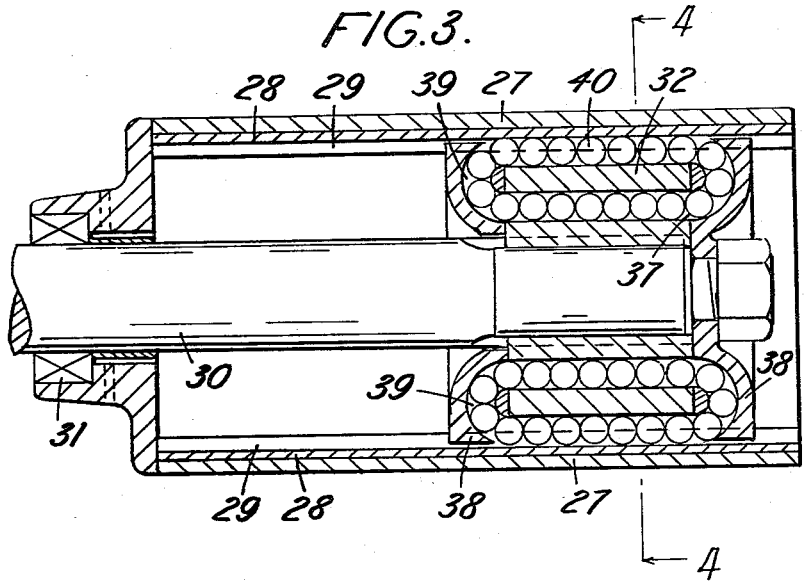
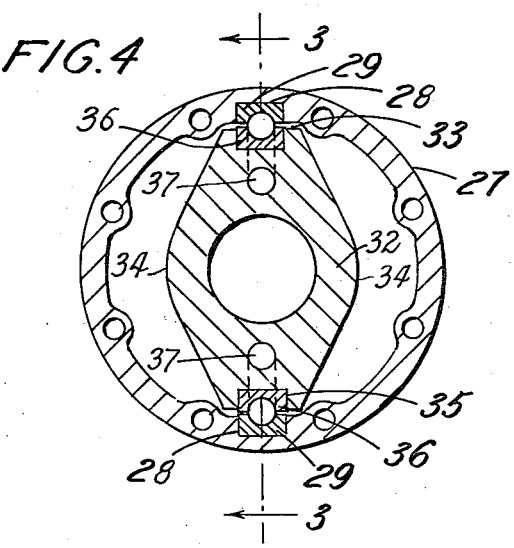
INVENTORS
ERNEST THOMAS JAMES TAPP
JOSEPH DAVEY
BY Irwin S. Thompson
ATTY.

Ernest Thomas James Tapp and Joseph Davey, Aldershot, England, assignors to County Commercial Cars Limited, Aldershot, England, a company of Great Britain
Filed Nov. 30, 1959, Ser. No. 856,057
Claims priority, application Great Britain Dec. 2, 1958
6 Claims. (Cl. 180—44)

This invention relates to driving transmissions for the rear wheels and front wheels of a motor vehicle at least one of which pairs is steerable and particularly for a four wheel drive tractor, and has for an object to provide a simple, light and robust arrangement.

Another object is to provide, in a driving transmission for the rear wheels and front wheels of a motor vehicle in which at least one of the pairs of wheels is steerable, a differential gear for the non-steerable wheels having an input shaft driven by the vehicle engine and two output shafts which are arranged respectively to drive two non-steerable wheels either directly or through gearing embodying lay shafts and which two output shafts or lay shafts are arranged respectively to drive the two steerable wheels through transmissions embodying universal joints or the like permitting pivotal steering movement of the wheels. The steerable wheels will generally be the front wheels, but may be the rear wheels on vehicles such as dumper or loader trucks. The double drive has the advantage that no slip can occur between the two wheels on the same side of the vehicle but differential movement can take place between the two wheels on one side of the vehicle and the two wheels on the other side of the vehicle. With this arrangement should the vehicle be diagonally supported, due to the lie of the ground, for instance on the near side front wheel and the off side back wheel, the propulsion force is not lost through wheel spin.

The following is a more detailed description of three embodiments of the invention as applied to a four wheel drive tractor, reference being made to the accompanying drawings in which:

FIGURE 1 is a plan view partly in section of one form of transmission between the rear wheels and front wheels of the vehicle, parts of the body being omitted;

FIGURE 2 is a side elevation of the arrangement shown in FIGURE 1;

FIGURE 3 is a longitudinal section on an enlarged scale of the telescopic end of the driving shaft taken on the line 3—3 of FIGURE 4;

FIGURE 4 is a section on the line 4—4 of FIGURE 3; and

Figure 5:
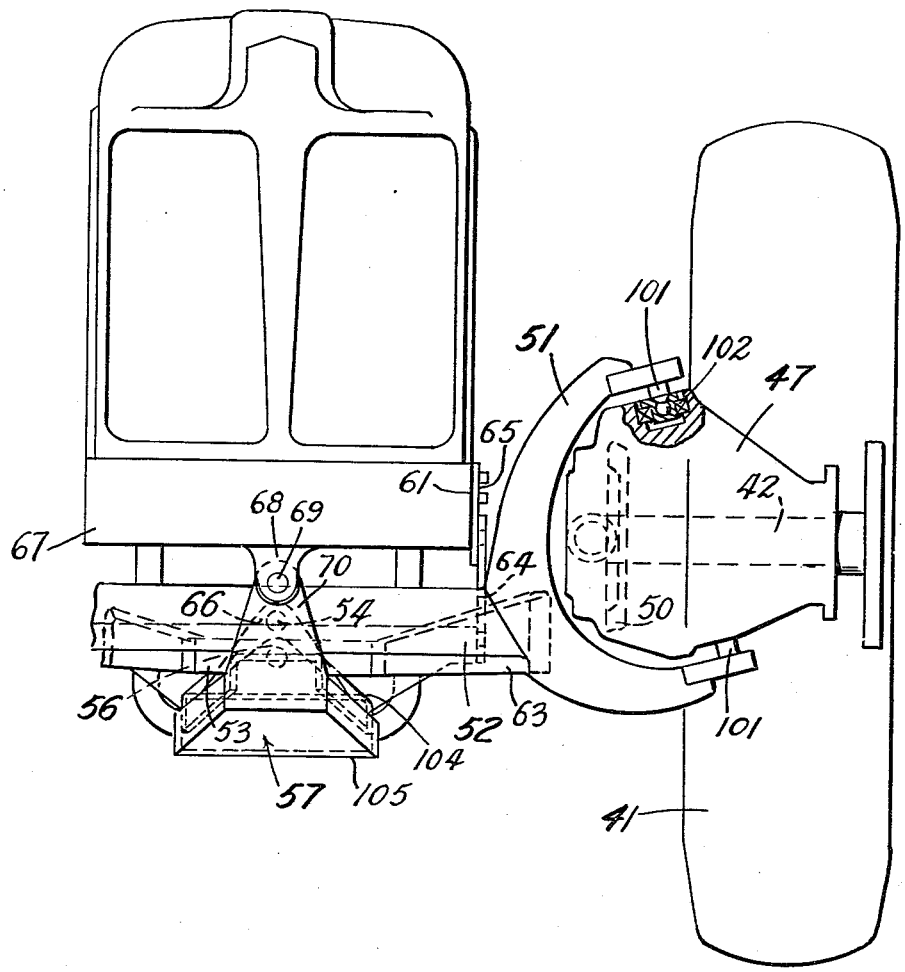
FIGURE 5 is a front elevation of the arrangement shown in FIGURE 1.

Referring to FIGURES 1 to 3 a tractor is provided in known manner with a differential gear 10 which is driven through gear wheels 14 and 15 and which drives lay shafts 11 on opposite sides thereof. Each of the lay shafts drives a half axle 12 for a road wheel 13 through gear wheels 99 and 100. In such an arrangement usually brake shoes 16 are mounted on a carrier 17 fixed to each lay shaft 11 and engage a drum 18 fixed to a casing 19 surrounding the lay shaft and fixed to the differential casing 9.

The projecting end of each lay shaft 11 has fixed to it a bevel gear wheel 20 which meshes with a second bevel gear wheel 21 on a spindle 22 carried by a bearing 23 in a housing 24 extending to one side of the lay shaft casing 19. The spindle 22 has attached to it one part 25 of a Hooke's type universal joint, the other part 26 of which is secured to one end of a tubular element 27. The tubular element is formed internally with two axially extending grooves 28 on opposite side thereof which accommodate hard metal grooved ball races 29.

A fore and aft extending driving shaft 30 passes through a bearing 31 at the other end of the tubular element 27 and has splined to it within the tubular element an enlarged head 32 substantially diamond shaped (see FIGURE 4) in cross-section and having two opposite corners flattened at 33 and the others rounded at 34. The flattened ends are provided with axial grooves 35 which accommodate hard metal grooved ball races 36, while a passage 37 parallel to each groove is formed in the head and extends from one end to the other. Secured over the opposite ends of the head are caps 38 having arcuate grooves 39 formed therein which serve to connect the ends of each axial groove 29 with one of said passages 37 to form a closed loop. The ball races in the head and the tubular element are arranged opposite one another and each loop is filled with bearing balls 40. Thus the head 32 and shaft 30 are keyed to the tubular element 27 and can freely slide therein providing in effect a telescopic shaft.

The forward end of each driving shaft 30 terminates opposite the inner side of one of the front wheels 41 to the rear of the rotatable spindle 42 to which the wheel hub 48 is fixed. The shaft 30 has fixed to it one part 43 of another Hooke's type joint, the other part 44 of which is fixed to a spindle 45 extending through a bearing 46 in a multi-part housing 47. The inner end of the spindle 45 within the housing has fixed to it a bevel pinion 49 which engages a bevel wheel 50 fixed to the wheel hub 48. The hub 48 is supported at each end by bearings 8 in the housing 47. Each of the housings 47 is straddled by the limbs of a fork shaped mounting 51 having trunnion pins 101 which engage bearings 102 in a part of the housing 47 so that the housing and wheel may have steering movement about an axis at an appropriate angle to the vertical. The two fork shaped mountings 51 are secured to the ends of a laterally extending member 52 in the form of a cross bar to one side of which is welded a V-shaped rearwardly extending shaped yoke piece 53 through which extends a pivot pin 54 projecting from its apex. One end of the pin engages a bearing 55 formed in two lugs 56 projecting upwardly from an intermediate portion of a longitudinal member 57 which is mounted on the tractor in a manner described later. The forward end of the pin 54 is rotatable in two other lugs 66 projecting upwardly from the longitudinal member 57 further forward than the first said lugs. The laterally extending member 52 is rotatable on the latter end of the pin. The cross bar 52 can thus rock about a fore and aft axis. One of the housings 47 associated with the gear drive for a front wheel is connected to a part 58 of a conventional steering mechanism and two housings are pivotally connected to the ends of a track rod 103.

The body casting 3 of the tractor is provided in known manner, towards the rear end and beneath it with a strong part 59 for the attachment of a draw bar 60 and is also provided further forward with further strong parts 61 for attachment of implement mountings on either side of the body casting.

The forward end of the longitudinal member 57 is formed from two channel section bars 104, 105, the flanges of one bar nested within the other to form a rigid hollow member. The longitudinal member at its rear end comprises a single channel section member which is bolted at 62 to a spigot 6 projecting from a bracket 4 bolted at 5 to the rear strong part 59 of the tractor body. The forward end of the aforesaid draw bar 60 is connected by a pivot pin 2 to said bracket.

Two outriggers 63 are secured on opposite sides of the longitudinal member intermediate of its length and pivotally connected to the outriggers are the ends of two links 64 the other ends of which are pivoted to plates 65 on opposite sides of the other strong part 61 of the tractor body. These links provide resistance to torsional forces in the longitudinal movement and also accommodate for manufacturing tolerances. Further forward on the longitudinal member are the aforesaid two upstanding lugs 56 extending across the width of the member and yet further forward are two other upstanding lugs 66. As indicated above the pivot pin 54 extends through both pairs of lugs 56, 66 and through the aforesaid laterally extending member 52 and through the apex of the V-shaped yoke piece 53. The longitudinal member 57 extends still further forward beneath the radiator mounting 67 which latter is formed with two downwardly spaced lugs 68 carrying a fore and aft extending pin 69 (see FIGURE 2) which extends through a hole in another upstanding lug 70 on the longitudinal member 57 to form a guide allowing for longitudinal tolerances and for the longitudinal member to be located solely by the strong part 61 as indicated above. The extreme forward end of the longitudinal member is provided with a hook 71. With this arrangement any loads on the longitudinal member are transferred back to a strong part of the tractor body.

In the arrangement referred to above the pivoted laterally extending member 52 may be so constructed as to be resilient in a fore and aft direction or its pivotal connection with the vehicle may be arranged to yield resiliently or the connection between the member 52 and the mounting for the road wheel may yield resiliently.

We claim:

1. A motor vehicle having steerable and non-steerable wheels at opposite ends thereof comprising a main body casting having a first strong part positioned towards the rear of said casting and centrally disposed beneath it, said main body casting having towards its forward end on either side thereof further strong parts, a rigid fore and aft extending longitudinal member mounted at its rear end upon said first strong part, a support secured to an under part of said vehicle, means for connecting the forward end of said longitudinal member to said support, said connecting means being constrained by the support against lateral and vertical movements only, link means for pivotally connecting an intermediate portion of said longitudinal member to said further strong parts, a laterally extending supporting structure for the steerable wheels, means pivotally mounting said supporting structure on said longitudinal member for allowing said supporting structure to rock about a fore and aft axis, a shaft rotating with each non-steerable wheel, and a driving transmission connecting each steerable wheel to one of said shafts, said transmission including means to accommodate the rocking movement of said laterally extending supporting structure.

2. A motor vehicle according to claim 1 wherein a draw bar is pivotally connected to said first strong part.

3. A motor vehicle according to claim 1 wherein the forward end of said longitudinal member comprises a box-like structure, the means pivotally mounting said laterally extending supporting structure comprises a pivot extending through lugs on said box-like structure, and the rear end of said longitudinal member comprises a channel section having its forward end affixed in the box-like structure and its rear end affixed to and straddling a part secured to said first strong part.

4. A motor vehicle according to claim 1 wherein said laterally extending supporting structure comprises a cross member at the ends of which are pivotally connected means for mounting the steerable wheels, said means pivotally mounting said supporting structure on said longitudinal member comprising structural members affixed to said cross member which converge and join one another rearwardly, and means for pivotally connecting the top of the longitudinal member with the center of the cross member and the top of the longitudinal member with the junction between said structural members.

5. A motor vehicle according to claim 1 wherein said longitudinal member is provided on opposite sides thereof with outriggers and said link means are connected to the ends of said outriggers.

6. A motor vehicle according to claim 1 wherein the means for connecting said longitudinal member comprises an upstanding lug mounted on the forward end of said longitudinal member, said lug having a fore and aft extending pin at the upper end thereof which slidably engages said support.

References Cited in the file of this patent

UNITED STATES PATENTS

| | | |
|---|---|---|
| 1,164,206 | Palmer | Dec. 14, 1915 |
| 1,233,372 | Knight | July 17, 1917 |
| 1,239,990 | Ware | Sept. 11, 1917 |
| 1,306,227 | Kane | June 10, 1919 |
| 2,052,257 | Smith | Aug. 25, 1936 |
| 2,595,494 | Stratman | May 6, 1952 |
| 2,945,366 | Sears | July 19, 1960 |

FOREIGN PATENTS

| | | |
|---|---|---|
| 946,664 | France | Dec. 27, 1948 |
| 281,595 | Great Britain | Mar. 1, 1926 |
| 784,436 | Great Britain | Oct. 9, 1957 |